United States Patent
Sung (10) Patent No.: US 9,319,500 B2
(45) Date of Patent: Apr. 19, 2016

(54) ELECTRONIC DEVICE WITH DISPLAY HAVING REDUCED BORDER REGION

(71) Applicant: Chiun Mai Communication Systems, Inc., New Taipei (TW)

(72) Inventor: Fu-Hsin Sung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/066,874

(22) Filed: Oct. 30, 2013

(65) Prior Publication Data

US 2014/0376161 A1    Dec. 25, 2014

(30) Foreign Application Priority Data

Jun. 21, 2013   (TW) .............................. 102211672 U (51) Int. Cl.
*H04M 1/02* (2006.01)
*G06F 1/16* (2006.01)

(52) U.S. Cl.
CPC .......... *H04M 1/0266* (2013.01); *G06F 1/1613* (2013.01); *H04M 2250/22* (2013.01)

(58) Field of Classification Search
CPC .................................................. H05K 5/0017
USPC ........... 361/679.01, 688, 752, 736–737, 756, 361/759, 814
See application file for complete search history.

(56) References Cited

U.S. PATENT DOCUMENTS

| | | | | |
|---|---|---|---|---|
| 6,111,760 A * | 8/2000 | Nixon | ................... | H04B 1/3833 220/4.02 |
| 6,808,239 B1 * | 10/2004 | Bader | ................. | H04M 1/0252 292/19 |
| 8,144,451 B2 * | 3/2012 | Rodgers | .............. | H04M 1/0252 361/679.01 |
| 2008/0239647 A1 * | 10/2008 | Luo | ........................ | E05C 19/06 361/679.58 |
| 2009/0086119 A1 * | 4/2009 | Hiradate et al. | ................ | 349/58 |
| 2010/0061044 A1 * | 3/2010 | Zou et al. | ................. | 361/679.01 |
| 2010/0066682 A1 * | 3/2010 | Tseng et al. | .................. | 345/173 |
| 2012/0069497 A1 * | 3/2012 | Tang et al. | ............... | 361/679.01 |

\* cited by examiner

*Primary Examiner* — Tuan T Dinh
*Assistant Examiner* — Rockshana Chowdhury
(74) *Attorney, Agent, or Firm* — Novak Druce Connolly Bove + Quigg LLP (57) ABSTRACT

An electronic device includes a display module, a first housing, and a second housing. The display module includes a display and a touch plate. The first housing includes a flange and a number of latching blocks. The second housing includes a resisting wall and a number of receiving grooves, and a projection is formed in each receiving groove. The flange of the first housing abuts against the resisting wall, each latching block is received in a corresponding receiving groove and is latched by the projection, the display 11 is received in the first housing, the touch plate is positioned on the display, and a peripheral edge of the touch plate is positioned on the flange and the projections.

7 Claims, 8 Drawing Sheets

ELECTRONIC DEVICE WITH DISPLAY HAVING REDUCED BORDER REGION

BACKGROUND

1. Technical Field

The present disclosure generally relates to electronic devices, and particularly to an electronic device having a display with a reduced border region.

2. Description of Related Art

Portable electronic devices, such as mobile phones, laptops and personal digital assistants (PDAs), include a display. The display is secured to a housing of the electronic device. For example, the display may be fixed to the housing by a screw. Thus, a peripheral portion of the housing needs to provide some space for seating the screw, which increases a border region around the display.

Therefore, there is room for improvement within the art.

BRIEF DESCRIPTION OF THE DRAWINGS

Many aspects of the electronic device can be better understood with reference to the following drawings. The components in the drawings are not necessarily to scale, the emphasis instead being placed upon clearly illustrating the electronic device. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
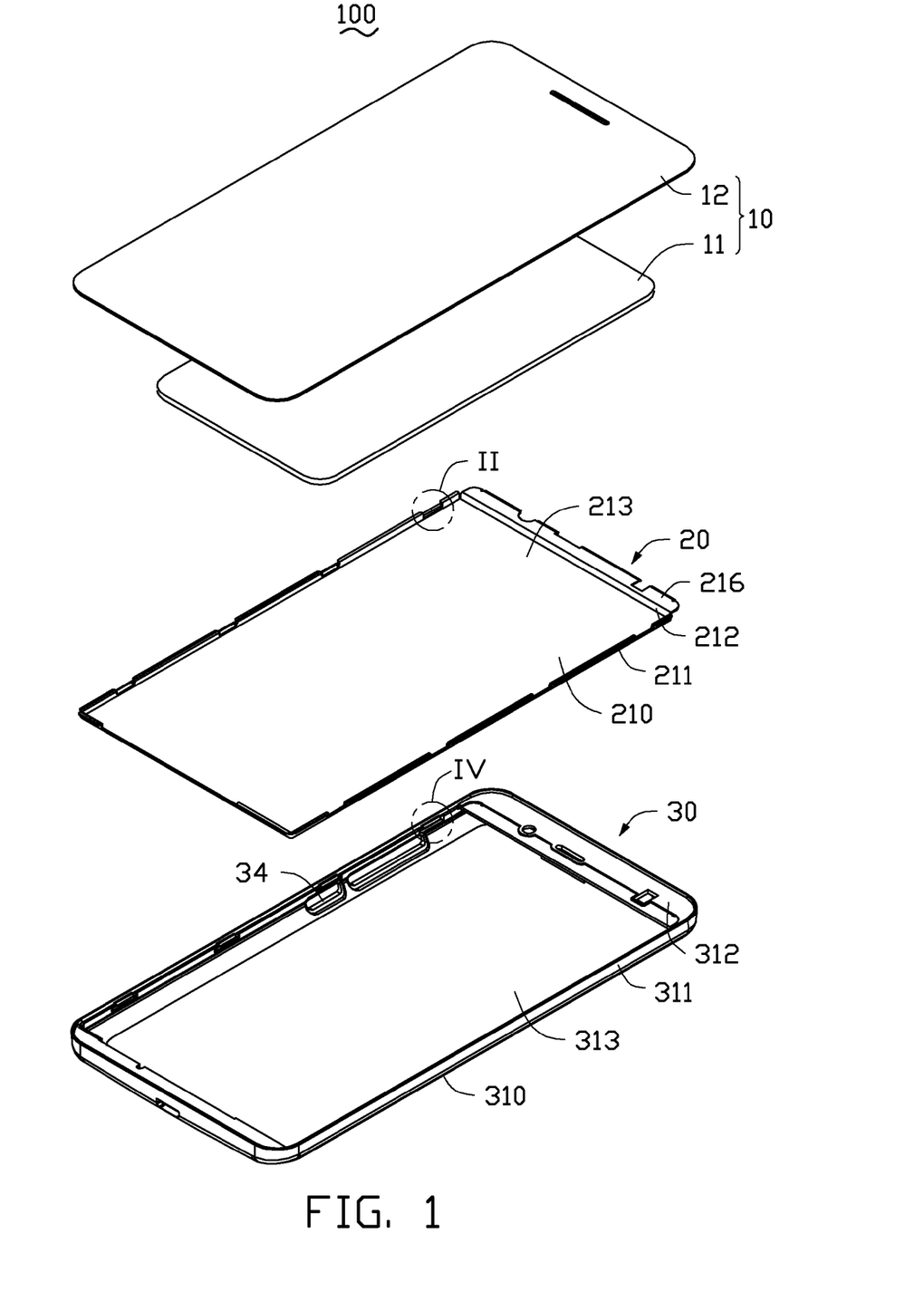
FIG. 1 is an isometric, exploded view of an exemplary embodiment of an electronic device.

Referring to FIG. 1, an electronic device 100 includes a display module 10, a first housing 20, and a second housing 30. The display module 10 is positioned on the first housing 20, and the second housing 30 receives the display module 10 and the first housing 20.

The display module 10 includes a display 11 and a touch plate 12. The touch plate 12 is made of transparent material and is directly positioned on the display 11.

Figure 2:
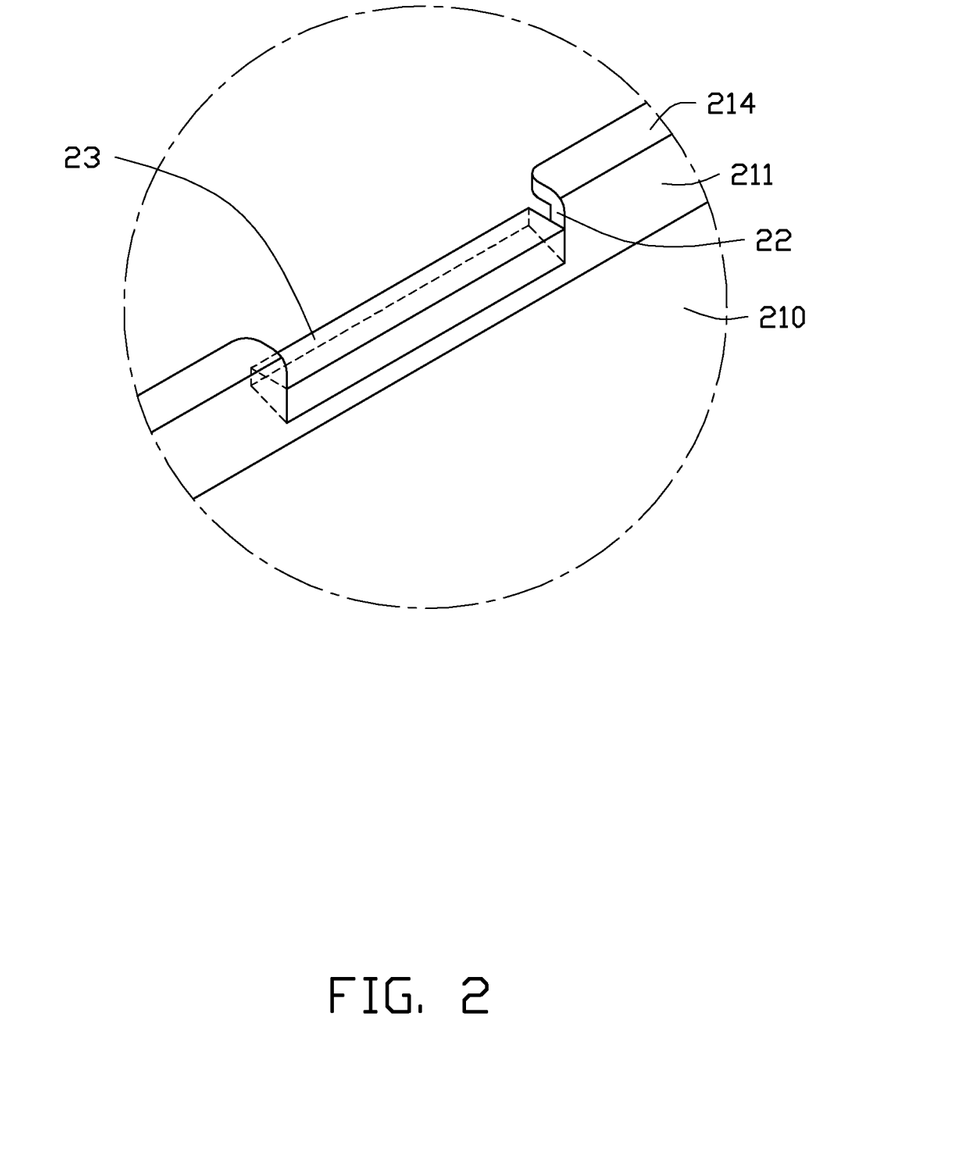
FIG. 2 is an enlarged view of a circled portion II of FIG. 1.

Referring to FIG. 2, the first housing 20 includes a plate body 210, two oppositely-facing first edges 211, and two oppositely-facing second edges 212. The first edges 211 and the second edges 212 extend substantially perpendicularly from peripheral edges of the plate 210, thereby cooperatively defining a receiving space 213. A flange 214 extends substantially perpendicularly from a top edge of each first edge 211 and away from the receiving groove 213. One of the second edges 212 has an extending edge 216 extending away from the receiving groove 213. The flanges 214 and the extending edge 216 of the first housing 20 are configured for engaging with the second housing 30.

Figure 3:
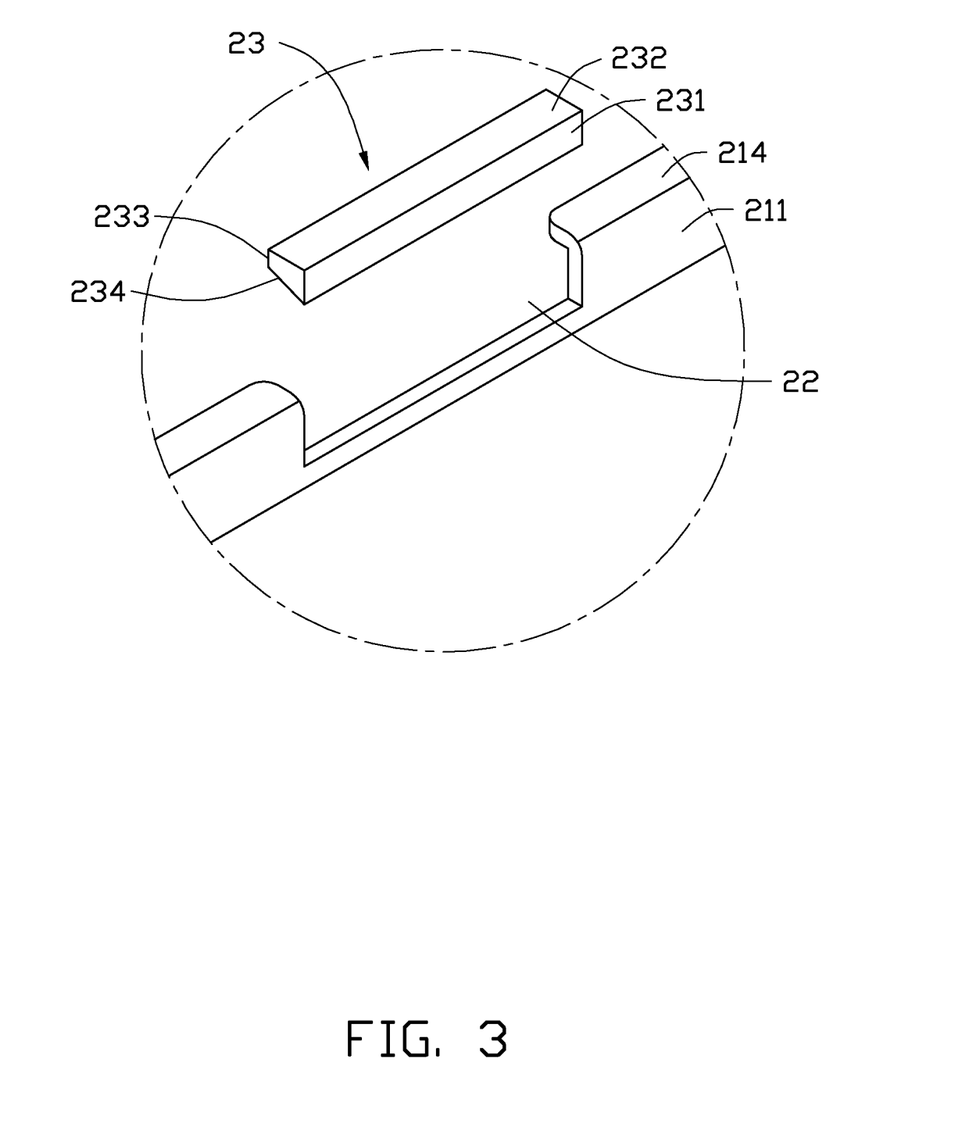
FIG. 3 is an exploded view of FIG. 2.

Referring to FIG. 3, each first edge 211 defines a plurality of latching grooves 22. A latching block 23 is received in each latching groove 22. A cross-section of the latching block 23 is trapezoidal, and the latching block 23 includes a first surface 231, a second surface 232, a third surface 233, and a fourth surface 234. The first surface 231 and the third surface 233 are substantially parallel to each other and are substantially perpendicular to the second surface 232. The fourth surface 234 is slantingly connected between the first surface 231 and the third surface 233. When the latching block 23 is received in the latching groove 22, the first surface 231 is coplanar with an inner surface of the first edge 211, and the fourth surface 234 faces a bottom wall of the latching groove 22. The latching block 23 may be made of plastic, metal, or metal-alloy.

In one embodiment, the latching block 23 is made of plastic and is formed by injection molding. The plastic can be polycarbonate (PC) or polymethyl methacrylate (PMMA). In another embodiment, the latching block 23 is made of metal. The metal can be made of copper, iron, chromium, or metal-alloy. When the first housing 20 is made of metal, the latching block 23 can be welded in the latching groove 22, or be integrally formed with first housing 10.

The second housing 30 includes a base plate 310, two oppositely-facing first sidewalls 311, and two oppositely-facing second sidewalls 312. The first sidewalls 311 and the second sidewalls 312 extend substantially perpendicularly from peripheral edges of the base plate 310. The first sidewalls 311, the second sidewalls 312, and the base plate 310 cooperatively define a receiving cavity 313. The second housing 30 defines a plurality of receiving grooves 321 and a plurality of button holes 34. Locations of the receiving grooves 321 correspond to the locations of the latching blocks 23. The button holes 34 are configured for receiving functional buttons, such as a power button or volume buttons.

Figure 4:
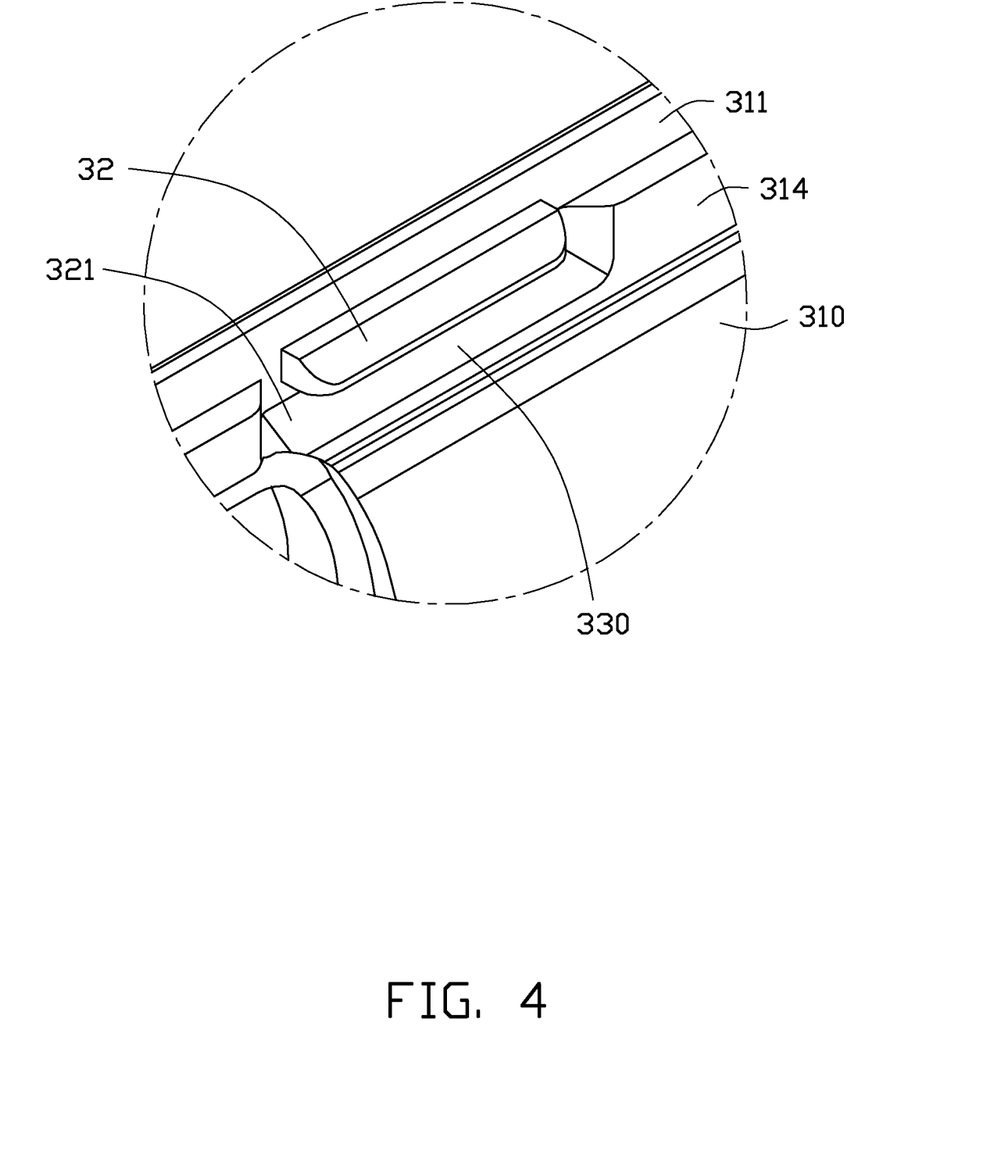
FIG. 4 is an enlarged view of a circled portion IV of FIG. 1.
Figure 5:
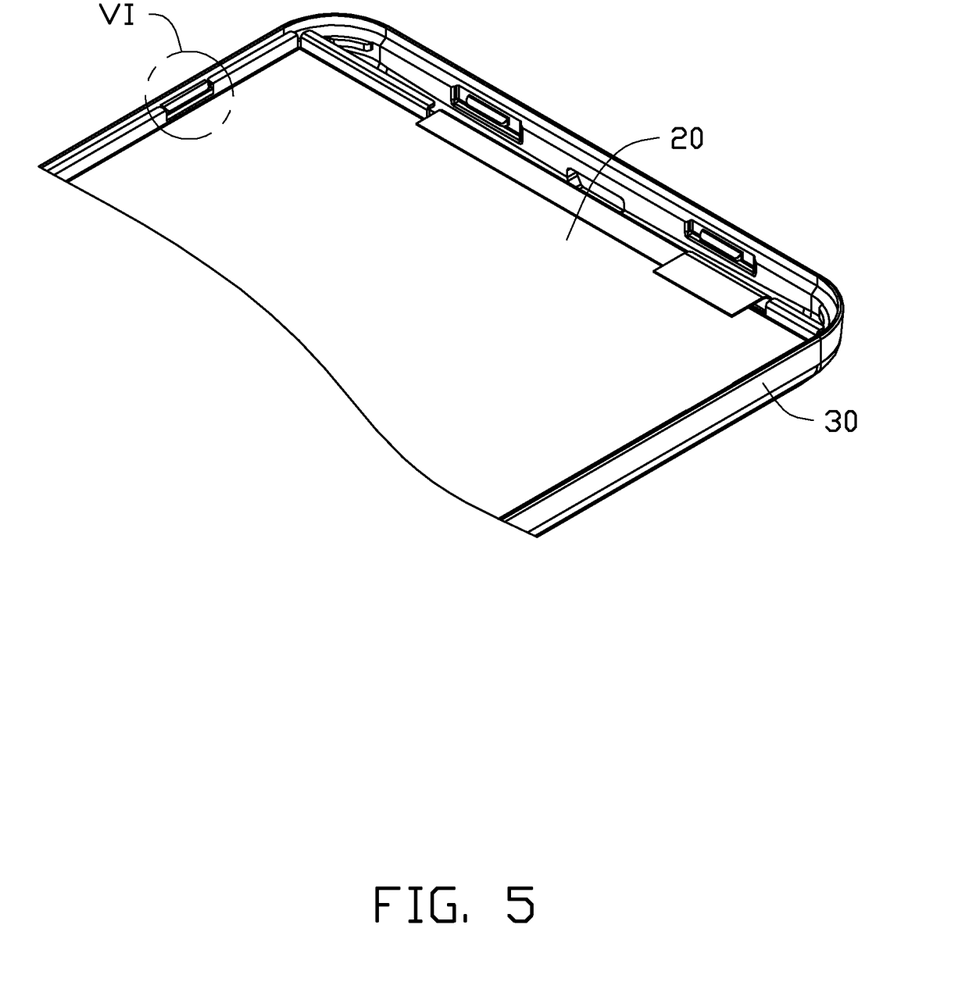
FIG. 5 is a partial, assembled view of the electronic device shown in FIG. 1.
Figure 6:
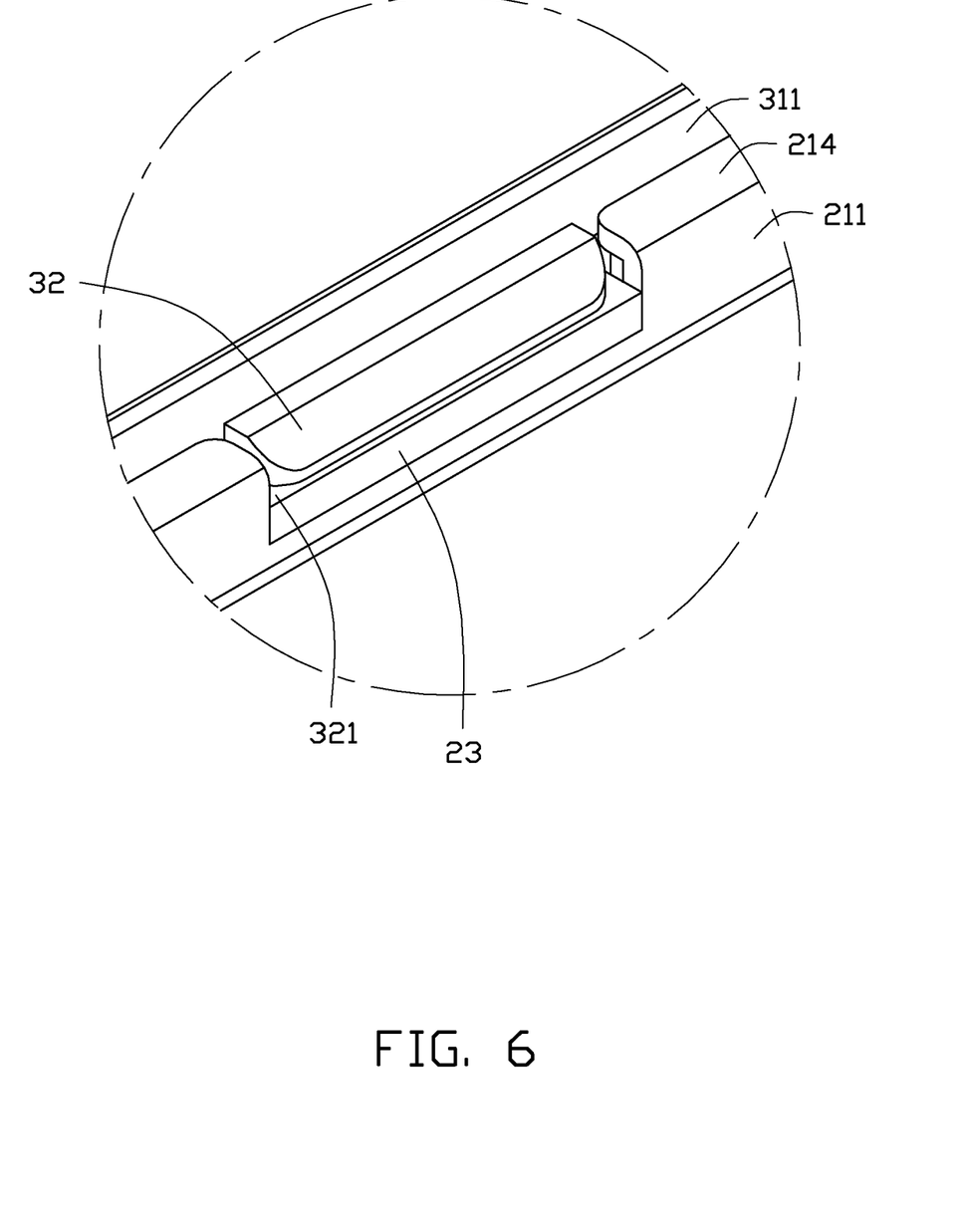
FIG. 6 is an enlarged view of a circled portion VI of FIG. 5.
Figure 7:
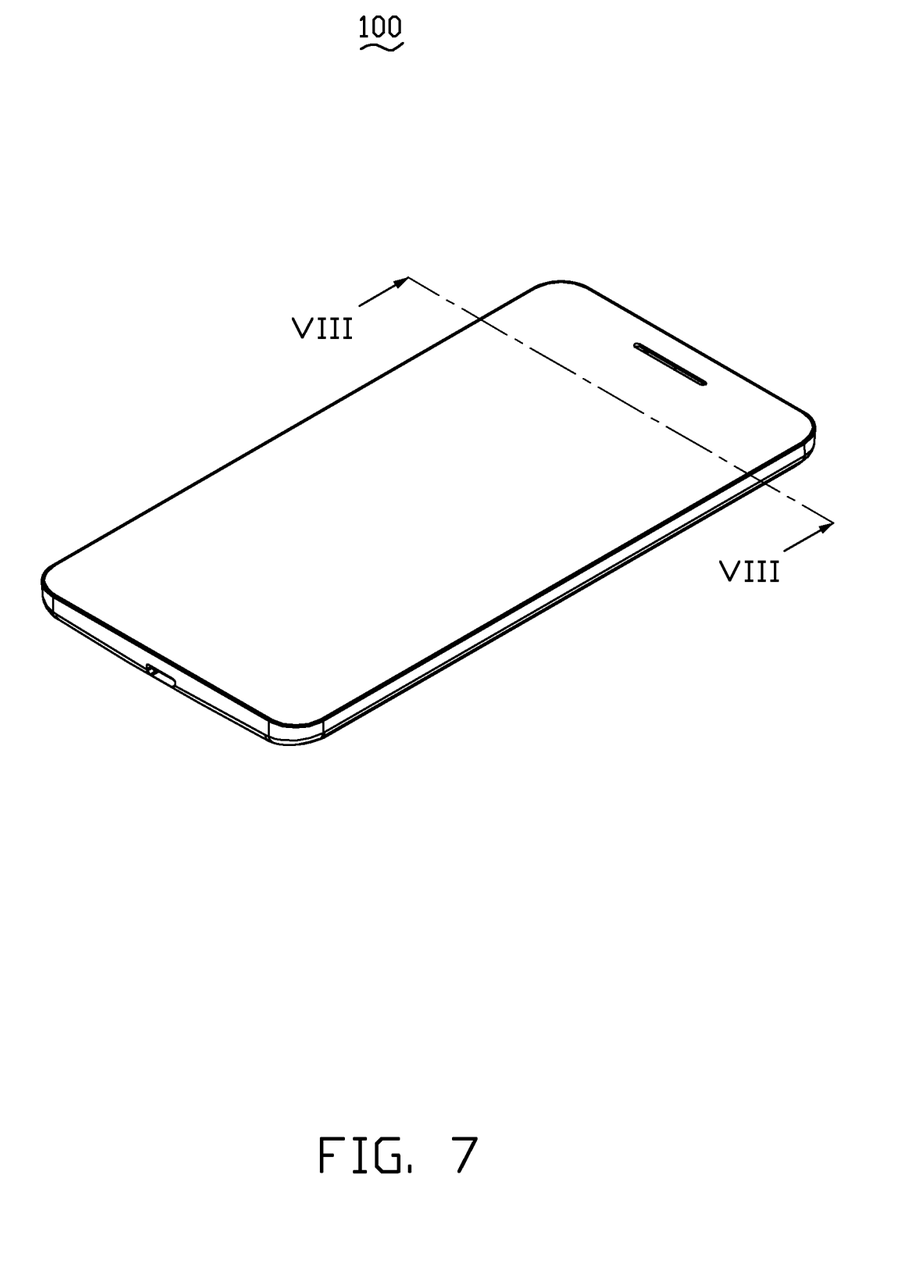
FIG. 7 is an assembled view of the electronic device shown in FIG. 1.
Figure 8:
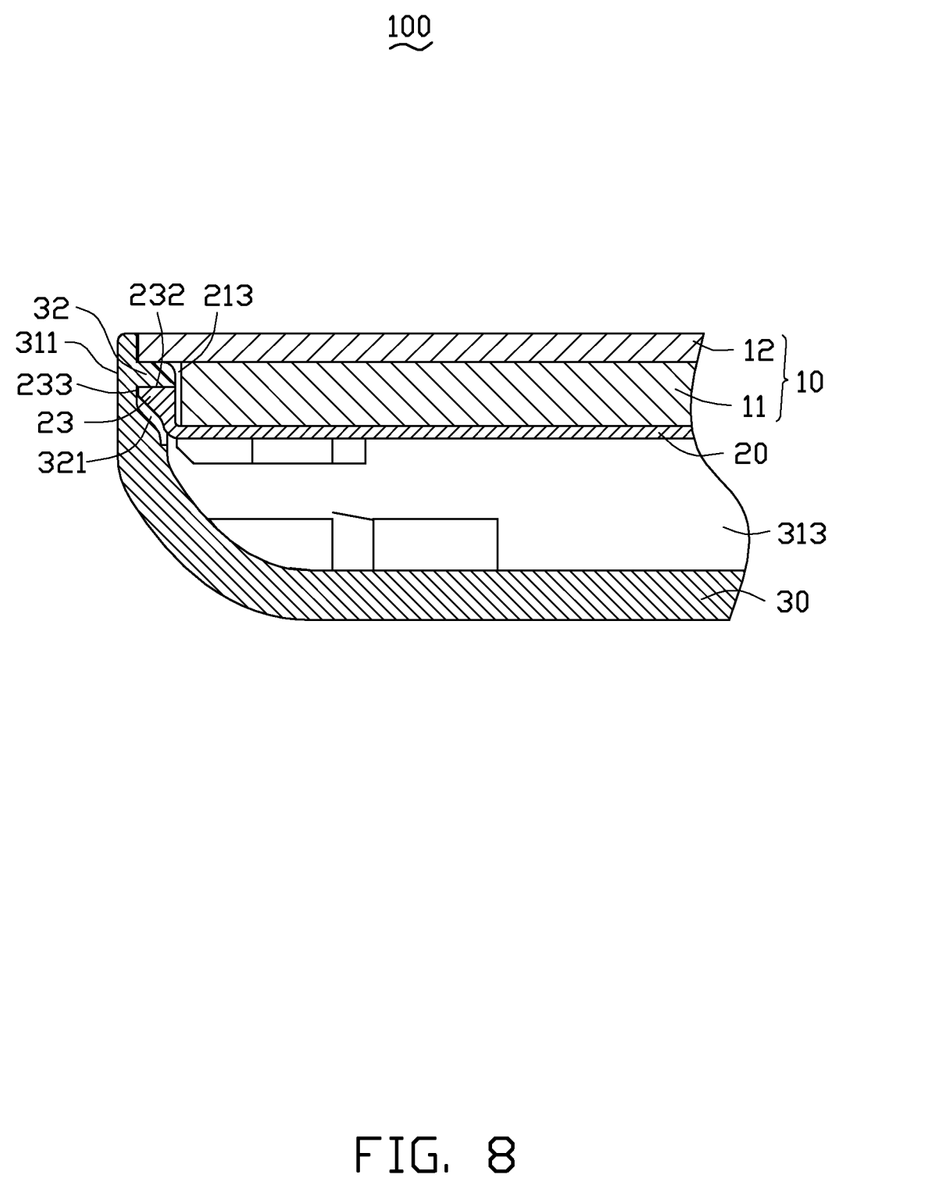
FIG. 8 is a cross-sectional view of taken along line VIII-VIII of FIG. 7.

Referring to FIG. 4, a resisting wall 314 extends from an inner surface of each first sidewall 311. A height of the resisting wall 314 is less than that of the first sidewall 311. A projection 32 is formed on an inner surface of the first sidewall 311 and protrudes into the receiving groove 321. The projection 32 is spaced from a bottom surface 330 of the receiving groove 321.

Referring to FIGS. 5 to 8, in assembly, when the first housing 20 is received in the second housing 30, the flange 214 of the first housing 20 abuts against a top surface of the resisting wall 314. Each latching block 23 is received in a corresponding receiving groove 321 and is latched by the projection 32. The second surface 232 of the latching block 23 abuts against an underside of the projection 32 of the second housing 30. The third surface 233 abuts against the first sidewall 311 of the second housing 30. Then, the display 11 is received in the receiving groove 213 of the first housing 20. The touch plate 12 is positioned on the display 11, and a peripheral edge of the touch plate 12 is positioned on the flange 214 and the projections 32. Thus, the electronic device 100 is completely assembled. A distance of a border region of the electronic device 100 is determined by a distance between the display 11 and an outer edge of the first sidewall 311. In this embodiment, the distance of the border region is about 1.5 millimeters (mm).

The present disclosure only uses the latching blocks and the flanges 214 of the first housing 20 to latch the first housing 20 with the second housing 30. Thus, the display 11 has a narrower border region.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a display module including a display and a touch plate;
a first housing including a plate body, two opposite first edges, two opposite second edges, a flange, and at least one latching block, wherein the first edges and the second edges perpendicularly extend from a peripheral edge of the plate body, thereby cooperatively defining a receiving space, the flange perpendicularly extends from a top edge of at least one of the first edges and away from the receiving space and is parallel to the plate body;
a second housing including a base plate, two opposite first sidewalls, two opposite second sidewalls, a resisting wall, and at least one projection, wherein the first sidewalls, the second sidewalls, and the base plate cooperatively surround a receiving cavity, and the resisting wall extends from an inner surface of at least one of the first sidewalls and defines at least one receiving groove, and wherein the at least one projection is formed on the inner surface of the first sidewalls, protrudes into the receiving groove of the resisting wall and is spaced from a bottom surface of the receiving groove;
wherein the first housing is disposed inside the receiving cavity of the second housing, the flange of the first housing abuts against a top surface of the resisting wall, a cross section of the at least one latching block is substantially trapezoid shape and comprises a first surface, a second surface, a third surface, and a fourth surface along a peripheral direction, the first surface and the third surface are parallel with each other, and are substantially perpendicular with opposite sides of the second surface, and the fourth surface is tilted with the first surface and the third surface, the at least one latching block is latched between the projection and the bottom surface of the receiving groove with the second surface of the at least one latching block abutting against an underside of the projection and the third surface of the at least one latching block abutting against the first sidewall of the second housing, the display is received in the first housing, and the touch plate is positioned on the display.

2. The electronic device as claimed in claim 1, wherein each first edge defines at least one latching groove, the at least one latching block is positioned in the at least one latching groove.

3. The electronic device as claimed in claim 1, wherein the at least one latching block is made of plastics, and is formed by injection molding.

4. The electronic device as claimed in claim 1, wherein the at least one latching block is made of metal, and is welded to the first housing.

5. The electronic device as claimed in claim 1, wherein the first sidewalls and the second sidewalls extend from a peripheral surface of the base plate.

6. The electronic device as claimed in claim 5, wherein a height of the resisting wall is lower than that of the first sidewall.

7. The electronic device as claimed in claim 1, wherein a peripheral edge of the touch plate is positioned on the flange and the projection.

* * * * *